(12) United States Patent
Gerbaulet et al.

(10) Patent No.: US 8,962,048 B2
(45) Date of Patent: Feb. 24, 2015

(54) CAPSULE FOR THE PREPARATION OF A BEVERAGE BY CENTRIFUGATION

(75) Inventors: Arnaud Gerbaulet, Oye et Pallet (FR); Jean-Francois Tinembart, Yverdon (CH); Thomas Kaeser, Brent (CH); Jean-Paul Denisart, La Conversion (CH); Carlo Magri, Monthey (CH)

(73) Assignee: Nestec S.A., Vevey (CH)

( * ) Notice: Subject to any disclaimer, the term of this patent is extended or adjusted under 35 U.S.C. 154(b) by 937 days.

(21) Appl. No.: 13/132,458

(22) PCT Filed: Nov. 27, 2009

(86) PCT No.: PCT/EP2009/065941
§ 371 (c)(1),
(2), (4) Date: Jun. 2, 2011

(87) PCT Pub. No.: WO2010/063644
PCT Pub. Date: Jun. 10, 2010

(65) Prior Publication Data
US 2011/0236541 A1    Sep. 29, 2011

(30) Foreign Application Priority Data

Dec. 3, 2008 (EP) .................................... 08170559
Sep. 8, 2009 (EP) .................................... 09169679

(51) Int. Cl.
*B65B 29/02* (2006.01)
*A47J 31/22* (2006.01)
*B65D 85/804* (2006.01)

(52) U.S. Cl.
CPC ............. *A47J 31/22* (2013.01); *B65D 85/8043* (2013.01)

USPC .............................................. 426/77; 99/295

(58) Field of Classification Search
CPC ............................. B65D 85/8043; A47J 31/22
USPC .............................................. 426/77; 99/295
See application file for complete search history.

(56) References Cited

FOREIGN PATENT DOCUMENTS

| | | |
|---|---|---|
| EP | 0367600 | 5/1990 |
| EP | 0524464 | 1/1993 |
| EP | 1555219 | 7/2005 |
| EP | 1579792 | 9/2005 |
| EP | 2125688 | 12/2009 |
| JP | 59082817 | 5/1984 |
| JP | 02124111 | 5/1990 |

(Continued)

OTHER PUBLICATIONS

International Preliminary Report of Patentability, Jul. 16, 2011.*

(Continued)

*Primary Examiner* — Rena L Dye
*Assistant Examiner* — Chaim Smith
(74) *Attorney, Agent, or Firm* — K&L Gates LLP (57) ABSTRACT

Method for preparing a beverage, from a capsule (1) containing a substance, received in a beverage production device comprising: feeding water by an injection needle (90) while creating liquid tightness between the central inlet portion (8) and the surface of the needle and dispensing the beverage from the capsule by centrifugation through outlets in the peripheral outlet portion (9), wherein the capsule is configured in the central inlet portion to provide liquid tightness between the liquid inlet and the surface of the needle to prevent liquid from leaking out-side of the capsule and wherein the capsule is configured to allow centrifuged liquid to pass through the outlets in the peripheral outlet portion (9).

18 Claims, 9 Drawing Sheets

(56) References Cited

FOREIGN PATENT DOCUMENTS

| | | |
|---|---|---|
| JP | 0519938 | 1/1993 |
| JP | 06511182 | 12/1994 |
| JP | 200519907 | 7/2005 |
| JP | 2005525146 | 8/2005 |
| JP | 2007503233 | 2/2007 |
| JP | 2007530108 | 11/2007 |
| JP | 2010504183 | 2/2010 |
| JP | 2010521263 | 6/2010 |
| WO | 2008037642 | 4/2008 |
| WO | 2008116818 | 10/2008 |
| WO | 2008148604 | 11/2008 |
| WO | 2008148650 | 11/2008 |

OTHER PUBLICATIONS

PCT International Search Report for International Application No. PCT/EP2009/065941 with a Date of mailing of Jan. 28, 2010, 3 pages.

Japanese Office Action for Appl. No. 2011-538965 dated Nov. 5, 2013—7 pages.

* cited by examiner

CAPSULE FOR THE PREPARATION OF A BEVERAGE BY CENTRIFUGATION

TECHNICAL FIELD

The present invention relates to the field of beverage preparation using capsules by way of centrifugation.

The principle consists in preparing a beverage, such as coffee, by passing a liquid through a substance contained in the capsule using centrifugal forces.

BACKGROUND OF THE INVENTION

A capsule for preparing a beverage or liquid food and a system using brewing centrifugal forces is described in WO2008/148604. Typically, the capsule is formed of a body containing a substance such as coffee powder which is closed by a membrane. The membrane is perforated by a water injection needle of the device in the central part of the membrane for injection of liquid and is simultaneously perforated in the peripheral part of the membrane by many smaller needles for extraction of the beverage.

It is recognized that a solution is needed for both allowing extraction of the beverage properly by centrifugation and ensuring that no injection liquid can bypass the substance contained in the capsule at the injection site. In particular, when injection liquid fills the capsule, liquid can leak out from the central inlet of the capsule and thereby be centrifuged on the outside of the upper surface of the capsule. This could affect the quality of the produced beverage, e.g., coffee.

SUMMARY OF THE INVENTION

The present invention provides a solution to this problem. For this, the invention, in a general aspect, relates to a capsule for the preparation of a beverage from a substance contained in the capsule in a beverage production device by passing liquid through the substance using centrifugal forces for producing the beverage comprising an enclosure containing an amount of beverage substance. The enclosure is delimited by a body comprising a side wall, a bottom wall, an opening and a flange-like rim and an upper wall attached to the flange-like rim of the body and covering the opening of the body. The upper wall comprises a central inlet portion and a peripheral outlet portion between the inlet portion and the flange-like rim. The peripheral outlet portion can be opened or at least openable openable, e.g. perforable, to allow beverage to leave the capsule under the centrifugal forces. The capsule is configured in the central inlet portion to provide liquid tightness between the liquid inlet and the surface of an injection needle of the beverage production device to prevent liquid from leaking from inside toward outside of the capsule. The capsule is also configured to allow centrifuged liquid to traverse the upper wall in the peripheral outlet portion.

The term "needle" means any sort of perforating or non-perforating intruding member of the beverage producing device enabling to feed liquid in the capsule from an external supply of liquid. In a particular form of the "needle", the needle is formed of a perforating tip.

In another more specific aspect, the invention relates to a capsule for the preparation of a beverage from a substance contained in the capsule in a beverage production device by passing liquid through the substance using centrifugal forces for producing the beverage comprising an enclosure containing an amount of beverage substance; said enclosure being delimited by:

a body comprising a side wall, a bottom wall, an opening and a flange-like rim, an upper wall attached to the flange-like rim of the body and covering the opening of the body;

wherein the upper wall comprises a central inlet portion and a peripheral outlet portion opened or openable to allow beverage to leave the capsule under the centrifugal forces, wherein the central inlet portion comprises a tightness-producing layer and, wherein the peripheral outlet portion presents at least one area without such tightness-producing layer.

The term "tightness" is meant here to designate the tightness to liquids, in particular, to an aqueous medium (e.g., water, liquid coffee extract, etc.).

The said area without such tightness-producing layer of the peripheral outlet portion is preferably an annular zone positioned adjacent to a sealing portion of the upper wall; said sealing portion being connected to the flange-like rim of the body. The said area can form the entire peripheral outlet portion or can be formed of discrete zones, e.g., of reduced thickness.

More particularly, the tightness-producing layer can be obtained by a resilient or soft material comparatively thicker than the same material in the peripheral outlet portion, or a more resilient or softer thickness of material than the material thickness in the peripheral outlet portion and/or a fibrous or foam material localized in the central inlet portion, to create in the central inlet portion, a liquid tightness by contact of such material with the outer surface of an injection needle of the device when said needle is introduced through the upper wall in the central inlet portion.

On the contrary, the peripheral outlet portion comprises a tearable material. Preferably, the outlet portion is made of puncturable material of comparatively lower puncture resistance than the puncture resistance of the central inlet portion.

Preferably, the central inlet portion is initially closed to be perforated by the injection needle used for feeding water in the capsule. In this mode, the capsule is fully closed and preferably made of a gastight material to prevent ingress of air in the capsule before perforation in order to extend freshness of the beverage substance, e.g., roast and ground coffee, for an extended period of time.

In an alternative mode, the tightness-producing layer has initially a resilient opening of smaller section (e.g., diameter) than the needle for elastically expanding when the injection needle is introduced through the upper wall and for tightly and elastically retracting around the surface of the needle when the needle is in the injection position through the upper wall. The benefit is to facilitate the introduction of the injection needle through the capsule and to avoid the needle to become blunt rapidly by a soft/fibrous material.

In a preferred mode, the upper wall comprises a puncturable membrane which extends both in the central and peripheral portions of the upper wall. The puncturable membrane is formed of at least one material extending in both portions that opposes a relatively lower tear resistance than the tightness-producing layer. The material for the membrane is also preferably a gastight material. Most preferably, the membrane comprises an aluminium layer. The aluminium layer has a thickness preferably comprised between 1 and 100 microns and more preferably between 10 and 50 microns. The aluminium layer can be reinforced by a heat seal lacquer containing at least polymer such as polyolefins (PP or PE or a copolymer of PP and PE), polyester such as PET, or other polymers. In a preferred mode, the membrane comprises a multilayer of aluminium and a sealing layer, e.g., PP or PET.

The sealing layer can be necessary to seal the upper wall of the capsule to the rim of the body such as heat sealing or ultrasounds.

Preferably, at least one layer of said more resilient, softer, fibrous or foam material thickness is at least partially connected to the membrane. Connection of the more resilient, softer, fibrous or foam material thickness to the membrane can be made by coating, spaying, lamination, welding, adhesion, injection-moulding, thermoforming and combinations thereof. This layer can be integral with the membrane (e.g., forming a laminated membrane) or covers the membrane on the internal side of the upper wall, or on the external side of the upper wall or can be embedded in the membrane in the central inlet portion, such as, for example, an embedded rubber or soft plastic insert sandwiched between two layers of lower tear resistance.

In general, the at least a one tightness-producing layer made of a material selected amongst the group consisting of silicone, polyolefins such as PE, PP or copolymers, polyamide, polyurethane, polyester such as PET, polybutylene terephtalate (PBT), PVC, biodegradable plastics (e.g., PLA) and combinations thereof.

In another mode, the material of said tightness-producing layer is a fibre material such as fabric, e.g., woven or nonwoven. The material can be chosen amongst plastic fibres and/or organic fibres (e.g., cardboard, cotton, linen, etc.). Most preferably, the material thickness is a filter mesh made of polyurethane elastomer having, e.g., a thickness between 15 and 500 microns. Polyurethane filter mesh can be heat sealed onto an aluminium or aluminium/PET membrane.

The layer can also be a foam such as PUR (polyurethane) or EVA (ethylene vinyl acetate) or PE or PP.

The layer of soft polymer, fibre or foam can be formed under the shape of a disc or patch of smaller diameter than the diameter of the upper wall for covering the central inlet portion but not extending over the entire peripheral outlet portion intended to be perforated by the extraction perforators. The disc or patch can be connected by any suitable connection means such as heat or ultrasonic welding or an adhesive.

In a mode, the material of said tightness-producing layer is a deposited hot melt material. The hot melt material is typically an amount of soft polymer deposited in liquid or paste state after softening (e.g., by a heated nozzle) and further pressed onto the membrane in the central inlet portion.

In another mode, the tightness-producing layer is obtained by providing the precursor layer at a surface of the membrane in both the central and peripheral portion of the upper wall and selectively removing the precursor layer, or at least reducing its thickness in the peripheral portion, e.g., by mechanical, laser or electrochemical scoring.

Preferably, the puncture resistance of the peripheral portion is reduced by providing at least one weakened line in the tightness-producing layer. More preferably, the weakened line is obtained by laser scoring a layer of polymer such as polypropylene or polyethylene. In one preferred example, the membrane is formed of a laminate of laser-scored cPP/aluminium/PET. The weakened line can be a continuous or discontinuous.

The capsule may further comprise a portion of engagement intended to form part of a valve means restricting the centrifuged flow of beverage leaving the capsule. This portion of engagement can be, for instance, an annular projection extending from the sealing surface of the rim.

The capsule of the invention can comprise a body having different shapes without departing from the scope of the invention. The body is preferably cup-shaped and can be sized in different volumes, e.g. different depths, to accommodate different doses of beverage ingredients, e.g., roast and ground coffee. The body can be of any material such as aluminium and/or plastic. In a mode, the body is made of aluminium, aluminium/PP, plastic such as PP or biodegradable plastics such as PLA, or plastics/cardboard or plastic/aluminium/plastic/cardboard. When no aluminium is used for the body, it preferably comprises a gas barrier such as EVOH. Lacquers and/or colouring layers can additionally be inserted to complete the body and/or upper wall.

In one particular mode, the upper wall of the capsule comprises a membrane which is perforable by a central needle of the device in the central portion and perforable by perforating members of the device in the peripheral portion, wherein the upper wall further comprises a tightness-producing layer extending both in the central and peripheral portions, wherein said tightness-producing layer is perforable by the central needle and configured to provide tightness between the needle and the central inlet perforated by the needle to prevent leakage of liquid from inside towards outside of the capsule around the needle, wherein said tightness-producing layer is configured to be perforable and/or porous to liquid to allow centrifuged liquid to exit the capsule through the outlet perforations created by the perforating members in the membrane.

The invention thereby also relates to a capsule for the preparation of a beverage from a substance contained in the capsule in a beverage production device by passing liquid through the substance using centrifugal forces for producing the beverage comprising an enclosure containing an amount of beverage substance; said enclosure being delimited by:

a body comprising a side wall, a bottom wall, an opening and a flange-like rim, an upper wall attached to the flange-like rim of the body and covering the opening of the body;

wherein the upper wall comprises a central inlet portion and a peripheral outlet portion between the inlet portion and the flange-like rim wherein the upper wall comprises a membrane which is perforable by a central needle of the device in the central portion and perforable by perforating members of the device in the peripheral portion, wherein the upper wall further comprises a tightness-producing layer extending both in the central and peripheral portions, wherein said tightness-producing layer is perforable by the central needle and configured to provide liquid tightness between the needle and the central inlet perforated by the needle to prevent leakage of liquid from inside towards outside of the capsule around the needle, wherein said tightness-producing layer is configured to be perforable and/or porous to liquid to allow centrifuged liquid to exit the capsule through the outlet perforations created by the perforating members in the membrane.

The invention also relates to a method for preparing a beverage from a capsule, as aforementioned, in a beverage production device comprising: feeding water by an injection needle while creating a liquid tightness between the central inlet portion of the capsule and the surface of the needle and dispensing the beverage from the capsule by centrifugation by outlets in the peripheral outlet portion The method may further comprise the operation of perforating outlets in the peripheral outlet portion. This operation can be carried out by introducing a plurality of perforating members distributed along a substantially circular path through the upper wall of the capsule in its peripheral outlet portion; wherein no liquid tightness arrangement is provided between the perforating members and the perforated outlets in the peripheral outlet portion in order to ensure a flow of beverage through the perforating outlets under the centrifugal forces.

The method may further comprise the operation of filtering the beverage coming out of the outlets between the perforated outlets and the outlet perforating members.

The invention also relates to a method for preparing a beverage, from a capsule containing a substance, received in a beverage production device, said capsule comprising an upper wall with a central inlet portion and a peripheral outlet portion; said method comprising:

feeding water by an injection needle while creating liquid tightness between the central inlet portion and the surface of the needle and dispensing the beverage from the capsule by centrifugation through outlets in the peripheral outlet portion, wherein the capsule is configured in the central inlet portion to provide liquid tightness between the liquid inlet and the surface of the needle to prevent liquid from leaking from inside toward outside of the capsule and wherein the capsule is configured to allow centrifuged liquid to traverse the upper wall in the peripheral outlet portion.

Preferably, liquid tightness is obtained by tight contact of at least one layer of the upper wall onto the surface of the injection needle. The contact is preferably obtained by a resilient material of said layer.

In the method of the invention, the liquid inlet is preferably perforated by the needle in the central inlet portion of the capsule.

The liquid outlets can also be perforated by perforating elements of the device in the peripheral outlet portion.

In the method of the invention, the liquid-tightness layer preferably extends at least in the central outlet portion.

In a first mode, the peripheral outlet portion is free of said liquid-tightness layer.

In another mode, the liquid-tightness layer extends in the peripheral outlet portion without creating tightness with the perforating elements. In particular, the liquid-tightness layer extends in the peripheral outlet portion while filtering the centrifuged liquid. For example, the layer can be meshed of fabric (e.g., woven or non-woven) made of a resilient material such as polyurethane or polyolefin (e.g., polyethylene).

In a mode, the upper wall comprises at least one layer of liquid porous material such as made of a resilient fabric.

The upper wall may comprise an outer liquid impermeable, perforable layer and an inner layer made of said porous material, e.g., fabric.

The porous layer may form a single layer of said upper wall which is sealed onto the flange-like rim.

BRIEF DESCRIPTIONS OF THE DRAWINGS

Additional features of the invention will appear in the detailed description of the figures which follows.

FIG. 13 is a cross sectional view of a beverage production device with another capsule of the invention which is engaged in.

DETAILED DESCRIPTION OF THE INVENTION

Figure 1:
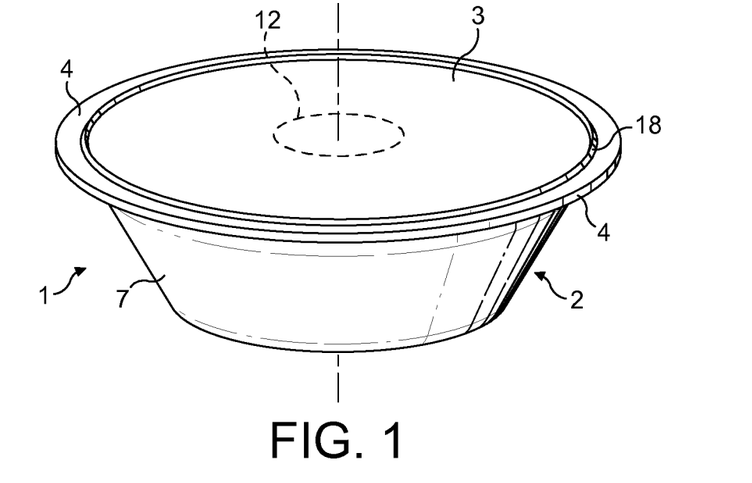
FIG. 1 is a perspective view from above of a capsule of the invention.
Figure 2:
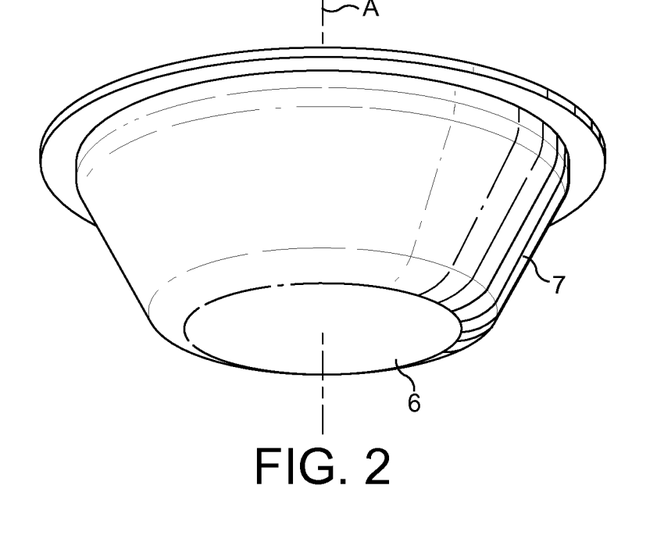
FIG. 2 is a perspective view from below of the capsule of FIG. 1.

As shown in FIGS. 1 and 2, a preferred capsule 1 of the invention generally comprises a dished body 2 onto which is sealed an upper wall 3. The upper wall 3 is sealed onto a peripheral rim 4 of the body at an annular sealing portion 10. The rim 4 can extend outwards forming an annular sealing small portion of between about 2-10 mm. The dished body comprises a bottom wall 6 and a side wall 7 which preferably widens in direction of the large open end of the body opposed to the bottom wall. The dished body is preferably rigid or semi-rigid. It can be formed of a food grade plastic, e.g., polypropylene, with a gas barrier layer such as EVOH and the like or aluminium alloy or a laminate of plastic and aluminium alloy.

Preferably, the capsule forms a symmetry of revolution around a central axis A. However, it should be noted that the capsule may not necessarily have a circular section around axis A but may take another form such as a square, a rectangle, or another polygonal form.

Figure 3:
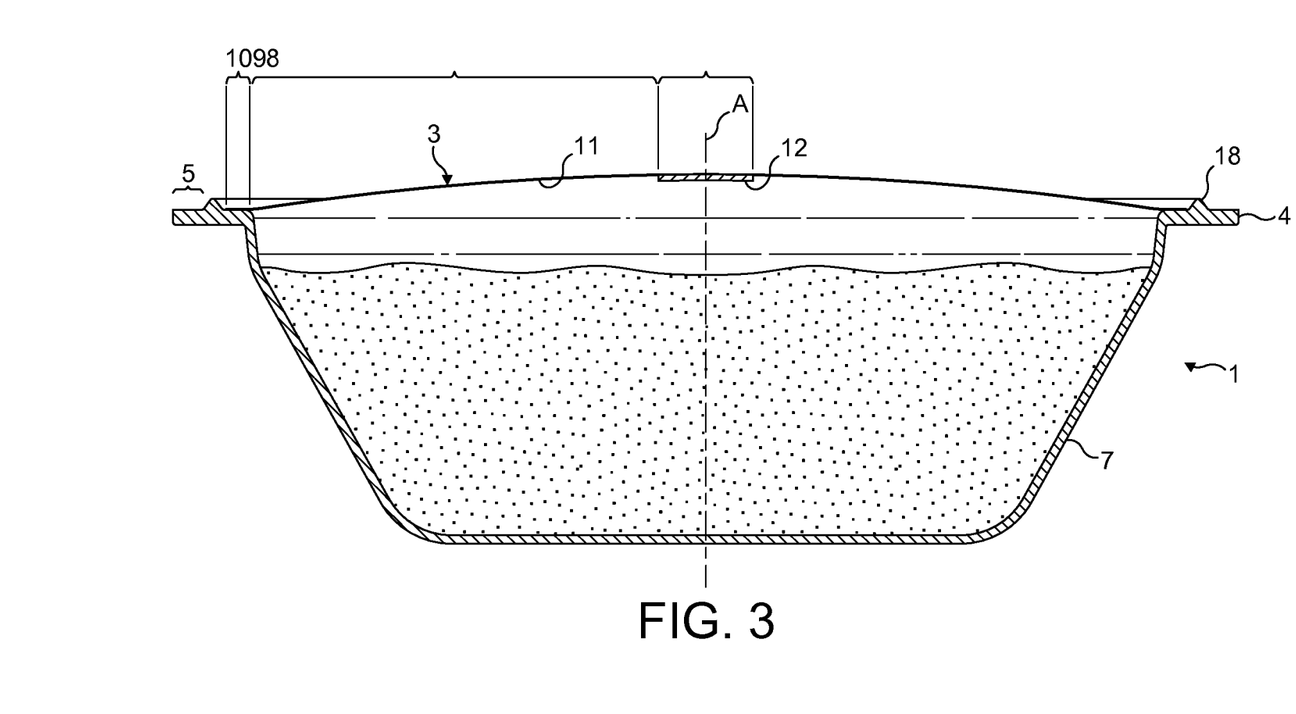
FIG. 3 is a cross sectional view of the capsule of FIG. 1.

As illustrated in FIG. 3, the upper wall 3 comprises a central inlet portion 8, a peripheral outlet portion 9 and a sealing portion 10. The upper wall 3 comprises a liquid-tight membrane 11 of relatively low tear resistance.

Preferably, the membrane is additionally gastight such as an aluminium or aluminium/PET membrane. The membrane is preferably of relatively low thickness, e.g., between 1 and 150 microns, most preferably between 15 and 100 microns.

The central inlet portion 8 extends from the central axis A in the radial direction of the capsule over a certain distance. The distance may represent between about 5 to 98%, preferably 5 to 75%, most preferably 10 to 35%, of the radius of the upper wall. The central portion 8 comprises a tightness-producing layer 12 which is connected to the membrane 11. Connection to the membrane is preferably obtained by sealing (heat seal or ultrasounds) or an adhesive. The tightness-producing layer 12 can be formed of a more resilient material than the membrane 11 such as elastomer (silicone, PBT) or a soft plastic such as polypropylene, PE or PA, or a fibrous material such as polyurethane (PUR), cotton, cardboard, linen or a foam. The tightness producing membrane is preferably of thicker material than the membrane. For example, the layer 12 is at least 1.5 time thicker, and preferably, more than 2 times thicker than the membrane 11. The layer 12 should be puncturable by an injection needle as will be explained later on.

The membrane 11 extends in the peripheral outlet portion 9 for forming an easy tearable area. Finally the membrane is sealed onto the flange-like rim 4 along a sealing portion 10. Sealing can be obtained by providing a specific sealing underlayer of the membrane containing at least polymers such as PET or polyolefins (PE or PP or their copolymers).

According to another aspect of the invention, the capsule of the invention comprises an annular raising portion 18 extending upwardly from the flange-like rim. The portion 18 forms part of a valve means for selectively blocking the flow of the centrifuged liquid coming out of the capsule as will also be explained later in the present description.

A first embodiment of a system including a capsule and a beverage preparation device of the invention is illustrated in FIGS. 4 to 7 and is described now.

Figure 4:
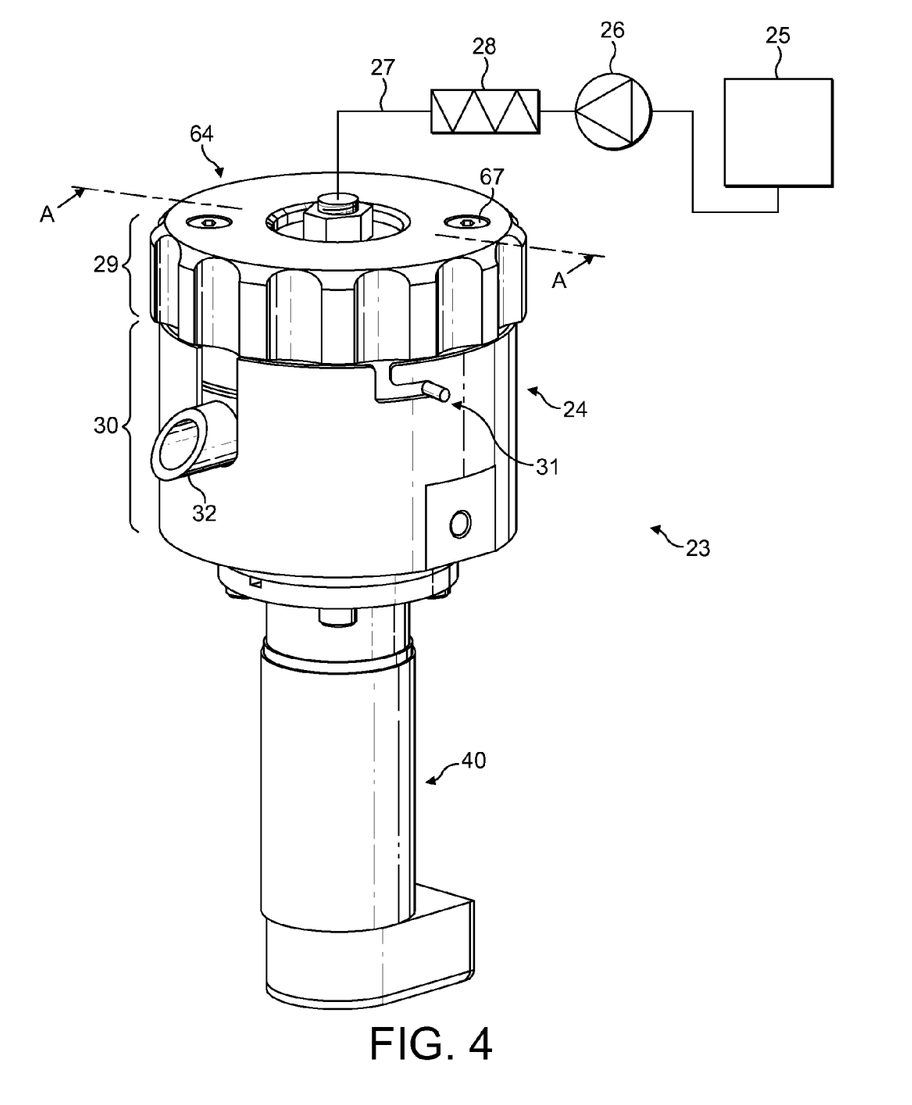
FIG. 4 is a perspective external view of a beverage production device for receiving the capsule of the invention.

The system comprises a capsule 1 as aforementioned and a beverage preparation device 23. The device has a module 24 which a capsule can be inserted in. The capsule contains a food substance for being brewed and the capsule is removed from the module after use for being discarded (e.g., for waste or recycling of the organic and inorganic raw materials). The module 24 is in fluid communication with a water supply such as a water reservoir 25. A fluid transport means such as a pump 26 is provided in the fluid circuit 27 between the module and the water supply. A water heater 28 is further provided to heat water in the fluid circuit before water enters the module. The water heater can be inserted in the fluid circuit to heat fresh water coming from the reservoir. Alternatively, the water heater can be placed in the water reservoir itself that becomes a water boiler in such case. Of course, water can also be taken directly from a domestic water supply via a water plug connection. The device may further comprise control means and activation means for activating the beverage preparation method (not illustrated).

Water can be fed in the module 24 at low pressure or even at gravity pressure. For example, a pressure of between 0 and 2 bar above atmospheric pressure can be envisaged at the water inlet of the module. Water at higher pressure than 2 bar could also be delivered if a pressure pump is utilized such as a piston pump.

The brewing module 24 can comprise two main capsule encasing sub-assemblies 29, 30; mainly comprising a water injection sub-assembly or water injection head and a liquid receiving subassembly including a capsule holder. The two subassemblies form positioning and centring means for referencing the capsule in rotation in the device.

Figure 5:
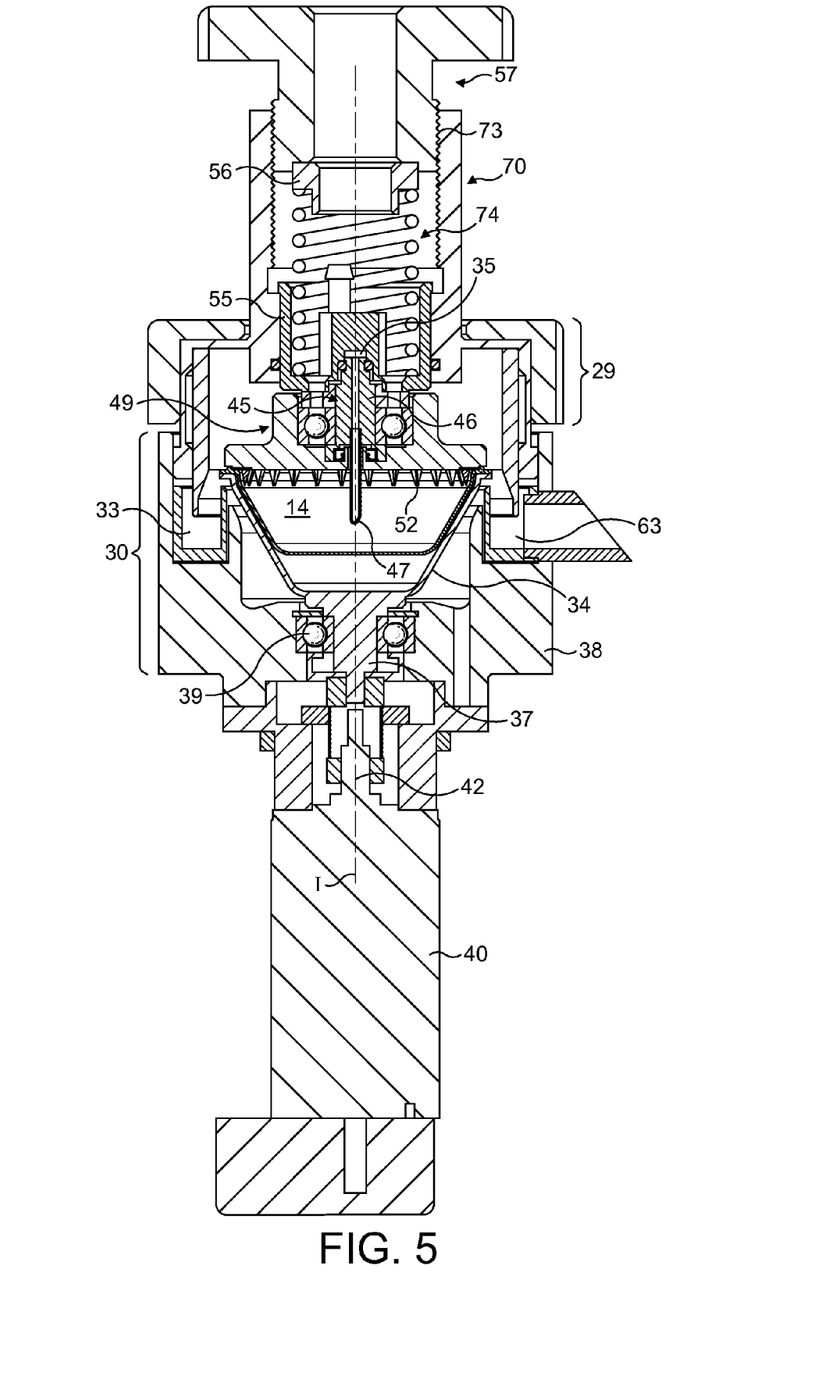
FIG. 5 is a cross sectional view of a beverage production device with a capsule inside.

The two subassemblies' closes together to encase a capsule therein for example by a bayonet-type connection system 31 or any other suitable closure means such as a mechanism based on a jaw-type closure principle. The liquid receiving subassembly 30 comprises a liquid duct 32, for example, protruding on a side of the subassembly for guiding the centrifuged liquid coming out of the capsule to a service receptacle such as a cup or glass. The liquid duct is in communication with a liquid receiver 33 forming a U-like or V-like shaped annular section surrounding a capsule holder comprising a rotating drum 34 into which the capsule can be inserted as illustrated in FIG. 5. The liquid receiver 33 defines a collecting cavity 63 for collecting the liquid as will be explained later in the description. Below the liquid receiving subassembly 30, are placed means for driving the capsule receiving drum 34 in rotation inside the subassembly.

The driving means preferably comprise a rotary motor 40 which can be supplied by electricity or gas power.

The water injection subassembly comprises a water inlet side comprising a water inlet 35 communicating upstream with the water fluid circuit 27. The rotary drum 34 prolongs itself axially by a rotating shaft 37 which is maintained in rotational relationship relative to an outer base 38 of the liquid receiver 33 by a rotational guiding means 39 like a ball bearing or needle bearing. Therefore, the rotary drum is designed to rotate around a median axis I whereas the outer base 38 of the receiver is fixed relative to the device. A mechanical coupling can be placed at the interface between the rotating shaft 37 of the drum and the shaft 42 of the motor 40.

Figure 6:
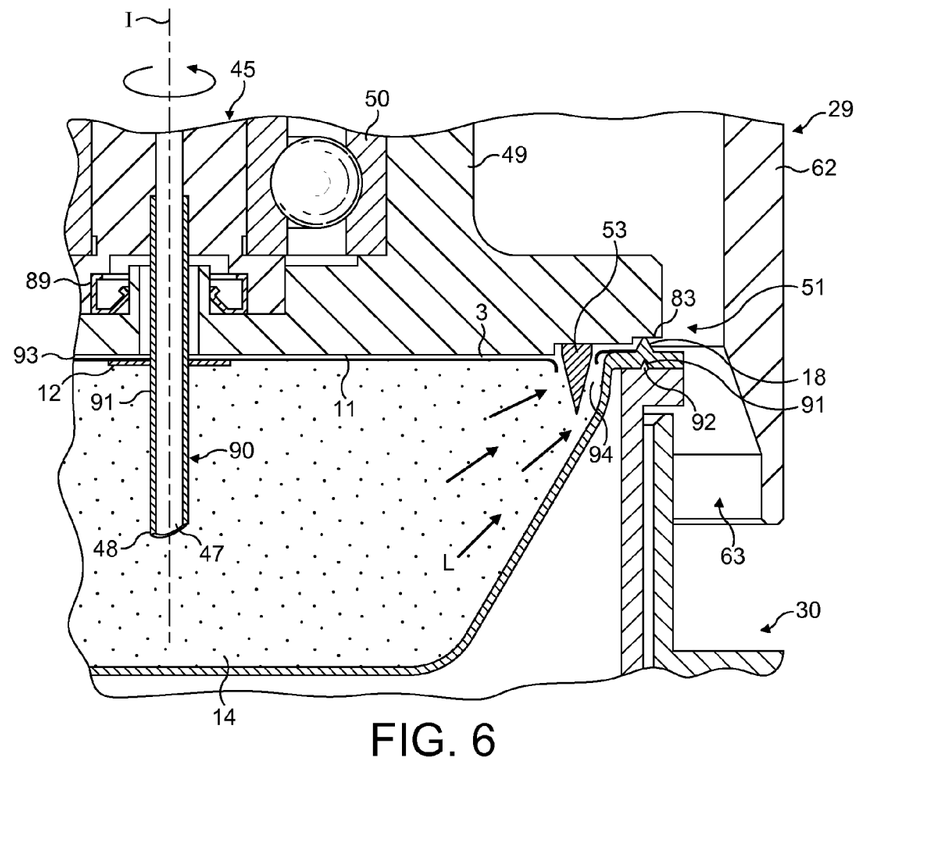
FIG. 6 is a detailed cross sectional view of FIG. 5.

Considering the water injection subassembly 29, it comprises a centrally arranged water injector 45 which is fixed relative to longitudinal axis I of the device. The water injector comprises a central tubular member 46 for transporting water from the inlet 35 to a water outlet 47 that is intended to protrude inside the enclosure 14 of the capsule. The central tubular member extends by a hollow needle 90 for intruding in the capsule and injecting liquid therein. For this, the water outlet is associated by a puncturing means such as a sharp tubular tip 48 that is able to create a punctured hole through the membrane lid 3 of the capsule (FIG. 6).

About the water injector is mounted a rotary engaging part or cover part 49. The engaging part 49 has a central bore for receiving the water injector and rotational guiding means such as a ball or needle bearing 50 inserted between the part 49 and the injector 45. A sealing means 89 is positioned between the ball bearing 50 and the injection needle 90 for preventing ingress of liquid from the capsule inside the bearing.

The capsule engaging subassembly 29 may further comprise a tubular portion of skirt 62 which protrudes in the internal annular chamber 63 of the liquid receiving subassembly 30 when the two subassemblies are closed relatively one another about a capsule. This tubular portion of skirt 62 forms an impact wall for the centrifuged liquid which exits the centrifuged capsule. This portion 62 is preferably fixed on the subassembly 29. The subassembly further comprises a handling portion 64 for facilitating the connection on the liquid receiving subassembly 30. This handling portion 64 can have a knurled peripheral surface for handling. The handling portion can be fixed on the fixed base of the subassembly 29 by screws 67.

This portion could of course be replaced by a lever mechanism or a similar handling means.

According to an aspect of the invention, the rotary engaging part comprises perforating members 53 located at the periphery of the part. The perforating members are placed in the peripheral portion 9, preferably much closer to the rim than to the central axis I (e.g., at a distance of about 2 to 10 mm from rim 4) for perforating the upper wall 3 of the capsule in the annular peripheral portion 9. More particularly, the perforating members are formed of sharp projections protruding from the lower surface of the engaging part. The upper wall is preferably perforated, at least partially, when the water injection subassembly 29 is moved relative to the capsule, when the capsule is in place in the capsule holder of the lower subassembly 30, during closure of the device, i.e., of the two sub-assemblies 29, 30, about the capsule.

The perforating elements 53 are preferably distributed along a circular path of the part.

In a preferred mode, the perforating members 53 are solid (i.e., not traversed by a liquid supply conduit) at the tip.

A valve means 51 is provided in the system in the flow path of the centrifuged liquid downstream of the perforating elements. The valve means can be any suitable valve providing opening or enlargement of the flow path of the centrifuged liquid leaving the capsule when a given threshold of liquid pressure is attained. The valve means is so calibrated to open at a given overpressure. For instance, the opening overpressure is comprised between 0.1 and 10 bar, preferably between 0.2 to 8 bar, most preferably between 0.5 and 3 bar, of overpressure.

In the preferred mode, as illustrated, the valve means comprises a portion of engagement, i.e., a raising portion 18 of the capsule, which projects from the sealing surface 10 of the flange-like rim 4 of the capsule. This portion of engagement forms a projection extending upwards from the substantially flat sealing surface 10 of the rim. The portion 18 can be formed integrally from the flange-like rim. In such case, the body 2 of the capsule including the flange-like rim is preferably made of plastics and/or aluminium. On the opposed side, the valve means comprises an engaging surface 83 of the rotary cover part 49. The engaging surface 83 may comprise various shapes depending on the particular shape of the projection 18. In a preferred mode, the engaging surface 83 is a substantially planar surface such as an annular flat surface. The engaging surface may be formed as an annular recessed portion of surface at the periphery of the lower surface 54 of the cover part 49 thereby allowing the base of perforating members to be lower than the base of the projection 18.

It should be noted that the engaging surface 83 may take many different shapes other than flat such as concave or convex.

As illustrated in FIG. 6, the flange-like rim of the capsule can comprise an annular groove 91 on its surface 82 opposed to the projection 18. The capsule holder of the device comprises a support portion comprising a support surface from which extends an annular indentation 92 which matches the shape of the annular groove 91 of the capsule. Hence, the indentation 92 can serve to position and reference the capsule in the device as well as to support the annular projection 8 of the valve means when being compressed by the rotary part 49. For instance, the projection and its counter-shape 81 can be formed during or after the forming of the body of the capsule such as by a manufacturing operation of deep drawing, embossing or thermoforming.

Figure 7:
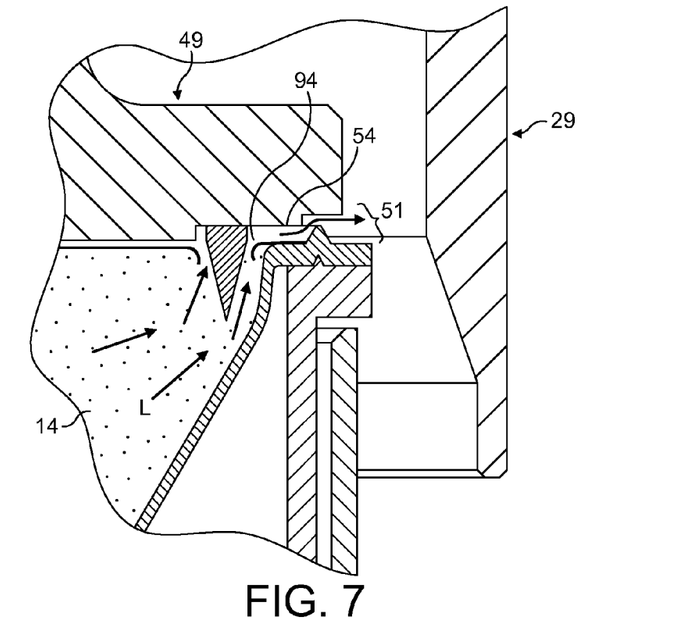
FIG. 7 is a further detail of FIG. 6.

The valve means 51 is designed to close under the force of a resilient closure load obtained by a load generating system 70 comprising a spring-biasing element 71. The spring-biasing element 71 applies a resilient load onto the rotary cover plate 49. The load primarily distributes itself onto the engaging surface 83 acting in closure against the raising portion 18 of the capsule. Therefore, the valve normally closes off the flow path for the centrifuged liquid until a sufficient pressure is exerted on the protrusion 18 by the centrifuged liquid exiting through the orifices created by the perforating elements. It should be noted that the protrusion 18 can still provide gas passage to ensure that the capsule can be filled with liquid while air or gas is vented properly. For example, the protrusion can be provided with one or more small radial grooves or a particular surface roughness allowing gas to escape (not illustrated). The liquid flows thus between the membrane 3 and the bottom surface 54 of the rotary cover part 49 and forces the valve 51 to open by pushing the whole cover part 49 upwards against the force of the spring-biasing element 71, as illustrated in FIG. 7. The centrifuged liquid can thus be ejected at a high velocity on the impact wall 62.

The load generating system 70 can be made adjustable as illustrated in FIG. 5 or 6, for controlling the opening pressure of the valve means. In particular, the system 70 can comprise a base 55 into which is fitted a first end of the spring-biasing element 71. At the opposed end of the spring-biasing element 71 is fixed, an abutting member 56 further connected to a screw element 57. The base 55, element 71 and abutting member 56 are housed into a tubular frame 58. The screw element 57 and tubular frame 58 form together an actuating means comprising a complementary thread 73 enabling to tune the compressive load of the spring-biasing element 71 on the engaging part 49. As illustrated in FIG. 6, both the membrane 11 and the tightness-producing layer 12 are perforated by the central injection needle 90 during closure of the sub-assemblies 29, 30 around the capsule. The layer 12 being more resilient or softer than the membrane 11, it creates a liquid tight seal on the external surface 91 of the needle. Liquid fed in the enclosure 14 by the water injector 45 is prevented from leaking along the surface 91 of the needle and contaminating the interstice 93 situated just between the membrane 11 of the upper wall of the capsule and the lower wall of the cover plate 49. When the device is driven in rotation along central axis I, as shown in FIG. 6, the liquid is forced to traverse the substance (e.g., along lines L) contained in the capsule and to exit through the perforations 94 created by the peripherally positioned perforating members 53 through the membrane in the peripheral outlet portion of the upper wall. There is substantially no liquid capable of taking a shortcut at the interstice 93 in the direction of the valve 51 because of the leak-tight arrangement created by the tightness-producing layer with the injection needle at the centre of the capsule. It can so be guaranteed that about 100% of the fed liquid traverses the substance in the capsule.

On the contrary, at the peripheral outlet portion (FIG. 7), the perforations 94 are provided in the membrane by the perforation members 53 to allow the centrifuged flow of liquid, e.g., coffee extract, to leak and so leave the capsule between the surface of the perforation members 53 and the edge of the perforated membrane in the direction of the valve 51. The pressure of liquid forces the valve to open and let the flow of liquid be projected on the surface of the portion of skirt 62. In the peripheral portion, the membrane is such that it also preferably filters the liquid by forming a relatively confined passage for the liquid flow while retaining solids in the capsule. For this, the material for the membrane is chosen to properly provide the filter effect. In particular, aluminium or aluminium/polymer have been found adequate for proposing both the tearable and filter functions required. Of course, it can be envisaged to obtain filtering by the addition of an additional filter that allow leakage of the centrifuged liquid but retain solids in the enclosure 14.

Figure 8:
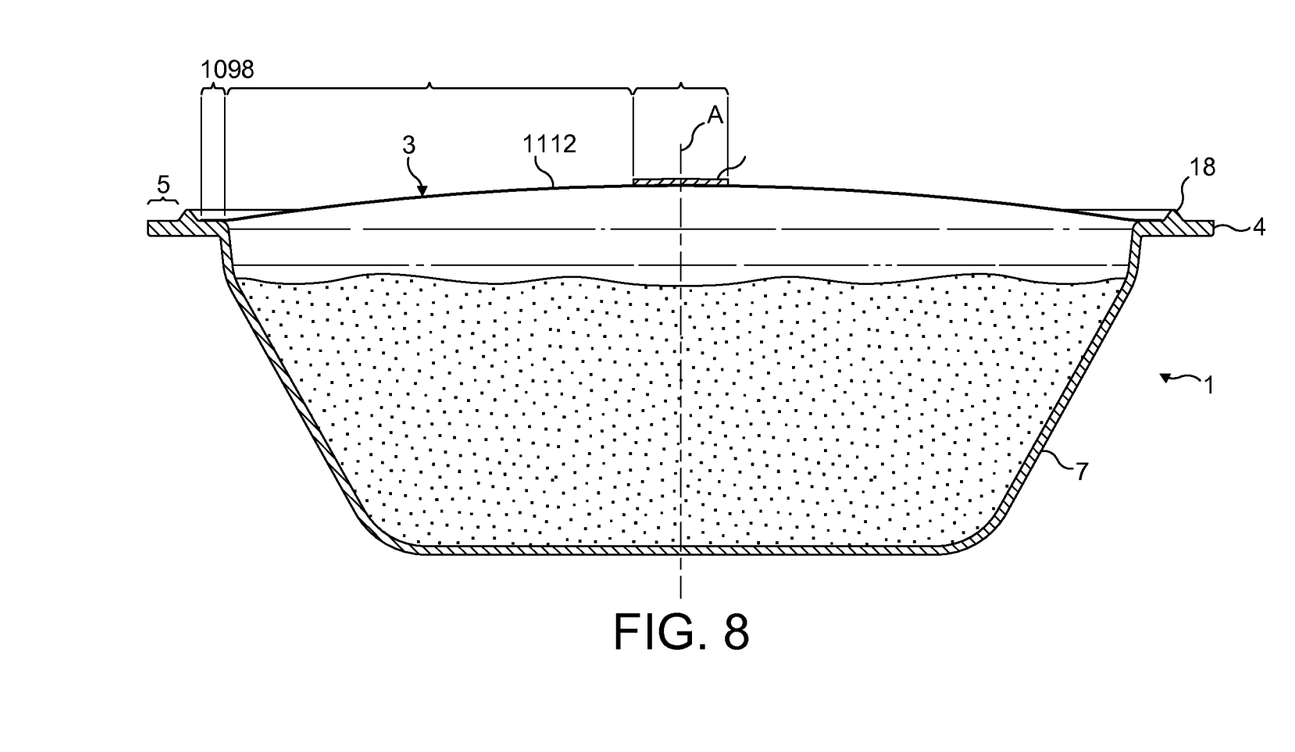
FIG. 8 is a cross sectional view of a capsule according to a second embodiment.

FIG. 8 shows another embodiment of the capsule of the invention. The only difference with FIG. 1 is that the tightness-producing layer is placed on the top side of the membrane 11. In both embodiments of FIGS. 1 and 8, the tightness-producing layer 12 can be a "hot melt", i.e., a soft patch applied by hot melt and pressed on the surface of the membrane. Suitable materials for hot melt is selected amongst the group consisting of polyolefins such as EVA, PE, PP or their copolymers, terpolymers, silicone, polyurethane and combinations thereof.

The tightness producing layer can also be a PP disc of about 70 to 300 micron-thick, a PP-elastomer filter or a PUR filter mesh disc. The filter can be produced by melt blown or other suitable techniques. The filter disc can so be cut and sealed onto the membrane at its bottom side (FIG. 1) or top side (FIG. 8).

Figure 9:
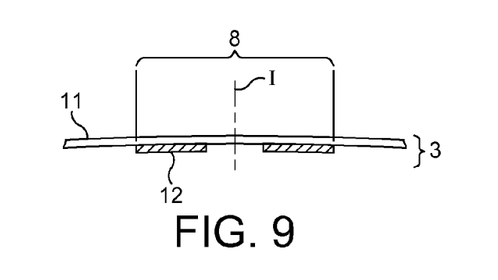
FIG. 9 is a detail in cross section of the upper wall of a capsule according to a third embodiment.
Figure 10:
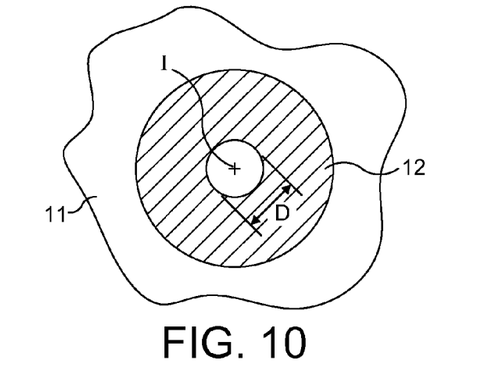
FIG. 10 is a bottom view of the upper wall of FIG. 9.

FIGS. 9 and 10 illustrate an other embodiment in which the tightness producing layer 12 is a disc of soft plastic (e.g., PP) or elastomer (e.g., silicone, PBT) or a filter disc (e.g., PUR), with a central opening for easing the introduction of the needle through the upper wall 3. Indeed, perforation by the needle of the tightness-producing layer 12 can prove to be difficult depending on the choice of material. In consequence, it is preferred to leave an opening of axis I to allow the needle to more easily perforate the wall. In this case, the tear resistance of the upper wall at the central inlet portion may be substantially the same as the tear resistance of the wall at the peripheral portion since only the membrane 11 is perforated by the perforating members/needles of the device. The opening is complementary sized relative to the needle to be slightly stretched by the needle when the needle is introduced through the upper wall. In particular, the diameter "D" of the opening could be slightly lower than the diameter of the injection needle 90 to ensure a better leak-tight engagement of the needle with the upper wall.

Figure 11:
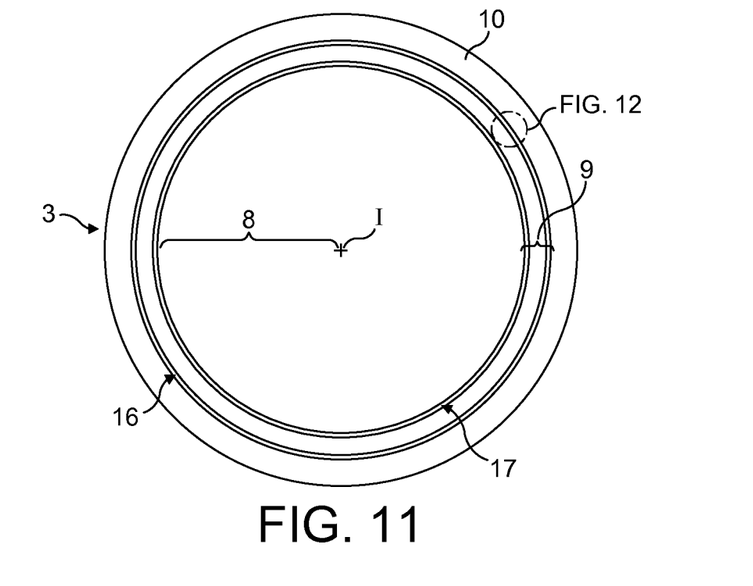
FIG. 11 is a top view of the upper wall according to a fourth embodiment.
Figure 12:
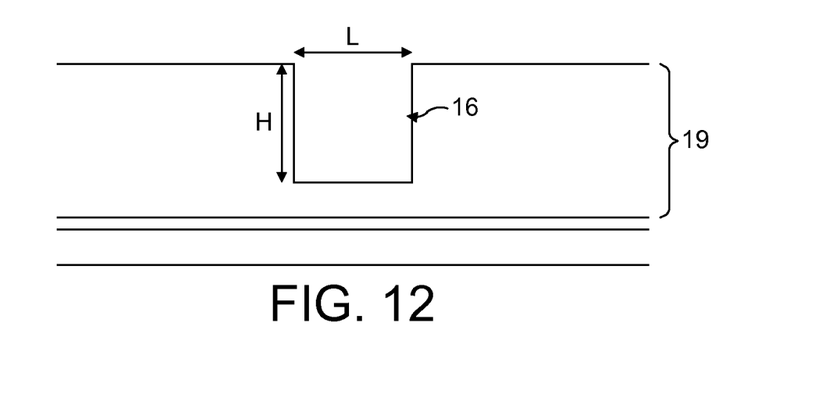
FIG. 12 is a detail of cross sectional view of the upper wall of FIG. 11.

FIGS. 11 and 12 illustrate another embodiment of the capsule of the invention in which the upper wall 3 is provided with a perforable outlet portion 9. The portion 9 is placed between the sealing portion 10 intended for sealing on the flange-like rim of the body and a central inlet portion 8. In the outlet portion 9, two weakened lines 16, 17 are formed by removal or thickness-reduction of a precursor layer 19 that forms the tightness-producing layer. The two lines 16, 17 are placed close and concentrically to each other to facilitate perforation by the outlet perforation members 53. The lines 16, 17 are preferably continuous over the all perimeter of the wall or can also be discontinuous, e.g., dotted lines. The upper wall can be formed of a multilayer comprising a relatively thick soft plastic or elastomeric layer 19 forming the precursor layer in the central portion. For example, the multilayer comprises a laminate formed of PP-Aluminium-HSL or PE-Aluminium-HSL wherein PP or PE forms the tightness-producing layer, aluminium essentially provides gas barrier and HSL forms the sealant layer(s) on the capsule flange. HSL stands here for "heat seal lacquer". The PP or PE layer has a thickness comprised between 40 and 150 microns before thickness reduction. Preferably, the reduction of thickness in the weakened line is of about 50 to 100% of the initial layer, most preferably of about 75 to 99%. The aluminium layer can be of thickness comprised between 1 and 100 microns, more preferably between 5 and 40 microns. the sealant layer can be of a thickness between 2 and 50 microns, preferably between 3 and 30 microns. The tightness-producing layer, i.e., PP or PE layer is removed or reduced in thickness to form the weakened lines as shown in FIG. 12, such as by laser scoring. The scored lines can extend along a width of between 0.05 and 1 mm and a depth H of between 10 and 150 microns.

Figure 13:
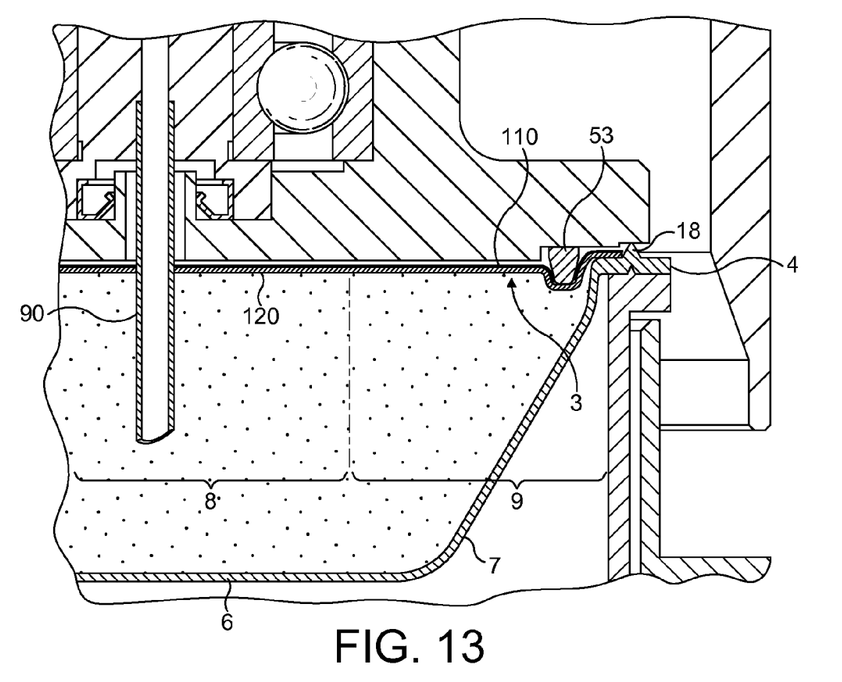

It should be noted that, in a possible mode of the invention illustrated in FIG. 13, the tightness-producing layer 120 can extend along the central portion (8) and the peripheral outlet portion (9) while not providing liquid tightness in the peripheral portion. The upper wall of the capsule comprises an upper membrane 110 which is perforable in both the central portion by needle 90 and by the perforating members 53. The outer layer 110 is preferably gastight. The upper wall further comprises an under-layer 120 which is perforated by the needle 90 but resists perforation by the perforating members 53. The membrane 110 and layer 120 can form a laminate along the whole surface of the upper wall 3. Alternatively, the layer 120 is connected only in the central portion and disconnected in the peripheral portion. The perforating members 53 are preferably designed as less perforating than the central needle 90. The layer 120 is thereby simply deflected inwards by the perforating members 53 thus creating a passage for the centrifuged liquid between the layer 120 and the perforated outlets in the membrane 110. The layer 120 can be formed in polyurethane or polyolefin (e.g., PE, PP). It can be a fabric, e.g., woven or non woven.

In another mode of the invention (not illustrated), the capsule comprises an upper wall 3 with only a liquid porous layer 120, the outer layer 110 being omitted or removed before insertion of the capsule in the device. The layer 120 is thereby sealed onto the flange-like rim 4 to close the body of the capsule in a manner that is not impervious to liquid. The layer 120 is configured to be perforable in the central portion 8 by the needle 90 and perforable or not perforable by the outlet perforating members 53. In any case, the layer 120 is resilient enough to provide a liquid tightness around the needle 90, while allowing liquid to leave the capsule in the peripheral portion 9 around the members 53. The layer can be formed of a fabric such as a woven or non-woven layer, made of elastomeric polymer, e.g., polyurethane elastomer.

The invention claimed is:

1. Capsule for the preparation of a beverage from a substance contained in the capsule in a beverage production device by passing liquid through the substance using centrifugal forces for producing the beverage comprising: an enclosure containing an amount of beverage substance;
the enclosure comprising: a body comprising a side wall, a bottom wall, an opening and a flange-like rim; an upper wall attached to the flange-like rim of the body and covering the opening of the body; and the upper wall comprises a central inlet portion and a peripheral outlet portion between the inlet portion and the flange-like rim, the peripheral outlet portion being opened or openable to allow beverage to leave the capsule under the centrifugal forces;
the capsule is designed so that the central inlet portion to provides a liquid tightness between the liquid inlet and the surface of an injection needle of the beverage production device preventing liquid from leaking from inside toward outside of the capsule;
the capsule is designed to allow centrifuged liquid to traverse the upper wall in the peripheral outlet portion;
wherein the central inlet portion comprises a tightness-producing layer and, the peripheral outlet portion presents at least an area without such tightness-producing layer; and
wherein the tightness-producing layer is obtained by using a structure selected from the group consisting of a resilient or soft material comparatively thicker than the same material in the peripheral outlet portion, a more resilient or softer thickness of material than the material thickness in the peripheral outlet portion and a fibrous or foam material localized in the central inlet portion, to create in the central inlet portion a liquid tightness by contact of such material with the outer surface of an injection needle of the device when introduced through the upper wall in the central inlet portion.

2. Capsule according to claim 1, wherein the peripheral outlet portion comprises a layer made of a puncturable material.

3. Capsule according to claim 1, wherein the central inlet portion is initially closed and perforated by the injection needle used for feeding water into the capsule.

4. Capsule according to claim 1, wherein the tightness-producing layer initially has a resilient opening of smaller diameter than the injection needle for elastically expanding when the injection needle is introduced through the upper wall and for tightly and elastically retracting around the surface of the injection needle when the needle is in an injection position through the upper wall.

5. Capsule according to claim 1, wherein the upper wall comprises a puncturable membrane which extends both in the central inlet and peripheral outlet portions of the upper wall.

6. Capsule according to claim 5, wherein the membrane comprises a gas barrier layer.

7. Capsule according to claim 5, wherein at least one tightness-producing layer of resilient, soft, fibrous or foam material is at least partially connected to the membrane.

8. Capsule according to claim 7, wherein the tightness-producing layer has a structure selected from the group consisting of: is integral with the membrane; covers the membrane on the internal side of the upper wall; covers the membrane on the external side of the upper wall; and is embedded in the membrane in the central portion.

9. Capsule according to claim 1, wherein the material of the tightness-producing layer is selected from the group consisting of elastomer, soft plastic and a combination thereof.

10. Capsule according to claim 9, wherein the tightness-producing layer is made of a material selected from the group consisting of silicone, polyolefins, a copolymer of PE and PP, polyamide, polyurethane, polyester, polybutylene terephtalate, PVC, biodegradable plastics and combinations thereof.

11. Capsule according to claim 1, wherein the material of the tightness-producing layer is a fabric.

12. Capsule according to claim 1, wherein the layer is a disc or patch.

13. Capsule according to claim 9, wherein the material of the tightness-producing layer is a hot melt material.

14. Capsule according to claim 1, wherein the upper wall comprises at least one weakened line in the peripheral outlet portion.

15. Capsule according to claim 1, wherein the tightness-producing layer is obtained by providing a precursor layer at a surface of the membrane in both the central and peripheral portion of the upper wall and selectively removing the precursor layer, or at least reducing its thickness in the peripheral portion.

16. Capsule according to claim 1, wherein the upper wall comprises a membrane which is perforable by a central needle of the device in the central portion and perforable by perforating members of the device in the peripheral portion,
wherein the upper wall further comprises a tightness-producing layer extending both in the central and peripheral portions,
the tightness-producing layer can be perforated by the central needle and designed to provide a tightness between the needle and the central inlet perforated by the needle to prevent leakage of liquid from inside towards outside of the capsule around the needle, and
the tightness-producing layer is configured to be perforable and/or porous to liquid to allow centrifuged liquid to exit the capsule through the outlet perforations created by the perforating members in the membrane.

17. Capsule for the preparation of a beverage from a substance contained in the capsule in a beverage production device by passing liquid through the substance using centrifugal forces for producing the beverage comprising an enclosure containing an amount of beverage substance, the enclosure comprising:
a body comprising a side wall, a bottom wall, an opening and a flange-like rim,
an upper wall attached to the flange-like rim of the body and covering the opening of the body;
the upper wall comprises a central inlet portion and a peripheral outlet portion between the inlet portion and the flange-like rim, the peripheral outlet portion being opened or openable to allow beverage to leave the capsule under the centrifugal forces;
the central inlet portion comprises a tightness-producing layer; and
the peripheral outlet portion comprises an area without such tightness-producing layer;
wherein the central inlet portion comprises a tightness-producing layer and, the peripheral outlet portion presents at least an area without such tightness-producing layer; and
wherein the tightness-producing layer is obtained by using a structure selected from the group consisting of a resilient or soft material comparatively thicker than the same material in the peripheral outlet portion, a more resilient or softer thickness of material than the material thickness in the peripheral outlet portion and a fibrous or foam material localized in the central inlet portion, to create in the central inlet portion a liquid tightness by contact of such material with the outer surface of an injection needle of the device when introduced through the upper wall in the central inlet portion.

18. Capsule for the preparation of a beverage from a substance contained in the capsule in a beverage production device by passing liquid through the substance using centrifugal forces for producing the beverage comprising an enclosure containing an amount of beverage substance; the enclosure comprising:
a body comprising a side wall, a bottom wall, an opening and a flange-like rim;
an upper wall attached to the flange-like rim of the body and covering the opening of the body;
the upper wall comprises a central inlet portion and a peripheral outlet portion between the inlet portion and the flange-like rim;
the upper wall comprises a membrane which can be perforated by a central needle of the device in the central portion and perforated by perforating members of the device in the peripheral portion;
the upper wall comprises a tightness-producing layer extending both in the central and peripheral portions;
the tightness-producing layer can be perforated by the central needle and is designed to provide a tightness between the needle and the central inlet perforated by the needle to prevent leakage of liquid from inside towards outside of the capsule around the needle; and
the tightness-producing layer is designed to be perforable and/or porous to liquid to allow centrifuged liquid to exit the capsule through the outlet perforations created by the perforating members in the membrane;
wherein the central inlet portion comprises a tightness-producing layer and, the peripheral outlet portion presents at least an area without such tightness-producing layer; and
wherein the tightness-producing layer is obtained by using a structure selected from the group consisting of a resilient or soft material comparatively thicker than the same material in the peripheral outlet portion, a more resilient or softer thickness of material than the material thickness in the peripheral outlet portion and a fibrous or foam material localized in the central inlet portion, to create in the central inlet portion a liquid tightness by contact of such material with the outer surface of an injection needle of the device when introduced through the upper wall in the central inlet portion.

* * * * *